United States Patent
Grenabo

(10) Patent No.: US 6,198,908 B1
(45) Date of Patent: Mar. 6, 2001

(54) SYSTEM AND A METHOD FOR TRANSFER OF A DIGITAL INFORMATION CARRYING SIGNAL

(75) Inventor: Håkan Grenabo, Göteborg (SE)

(73) Assignee: Allgon AB, Akersberga (SE)

( * ) Notice: Subject to any disclaimer, the term of this patent is extended or adjusted under 35 U.S.C. 154(b) by 0 days.

(21) Appl. No.: 09/261,173

(22) Filed: Mar. 3, 1999

(30) Foreign Application Priority Data

Mar. 4, 1998 (SE) .................................................. 9800683

(51) Int. Cl.[7] ....................................................... H04B 7/00
(52) U.S. Cl. ............................ 455/44; 455/110; 455/375; 455/305
(58) Field of Search .................................. 455/41, 42, 43, 455/44, 39, 91, 110, 112, 113, 205, 206, 207; 375/295, 296, 297, 302, 303, 305, 322, 336

(56) References Cited

U.S. PATENT DOCUMENTS 4,581,749 * 4/1986 Carney et al. ........................... 455/44
5,832,022 * 11/1998 Scott ..................................... 455/44

* cited by examiner

*Primary Examiner*—Thanh Cong Le
(74) *Attorney, Agent, or Firm*—Jacobson, Price, Holman & Stern, PLLC

(57) ABSTRACT

A system and a method for transfer of a digital information carrying signal 51 between an input of a transmitter and an output of a receiver. The information carrying signal is modulated in a modulator included in the transmitter 12, and the modulated signal is transmitted via a transmission medium 13 by transmission means 25 connected to the modulator. The transmitted signal is received by receiving means 41 included in the receiver, and the received signal is demodulated in a demodulator. The information carrying signal is modulated in the modulator with a predetermined first modulation index $h_0$, adapted for efficient use of an available bandwidth of said transmission medium. In the receiver 14 a frequency signal 63 is created from the received signal. Further, the frequency signal 63 is amplified with a factor A, for creating a scaled frequency signal 64, from which a scaled phase signal 65 is created. A digital output signal 66 is created as a response to the scaled phase signal 65 in a decision device 47 operating with a predetermined second modulation index $h_1$. The factor A is selected to be equal to $h_1/h_0$.

20 Claims, 2 Drawing Sheets

SYSTEM AND A METHOD FOR TRANSFER OF A DIGITAL INFORMATION CARRYING SIGNAL

FIELD OF THE INVENTION

The invention relates to a system for transfer of a digital information carrying signal between an input of a transmitter and an output of a receiver, the transmitter including a modulator for modulating the information carrying signal, the modulator being connected to transmission means for transmission of the modulated signal via a transmission medium, the receiver including receiving means, for receiving the transmitted signal, connected to a demodulator for demodulating the received signal.

Further it relates to a method for transfer of a digital information carrying signal between an input of a transmitter and an output of a receiver, where the information carrying signal is modulated in a modulator included in the transmitter, the modulated signal is transmitted via a transmission medium by transmission means connected to the modulator, the transmitted signal is received by receiving means included in the receiver, and the received signal is demodulated in a demodulator.

BACKGROUND OF THE INVENTION

A system and a method of the kind mentioned above are disclosed in WO A1 96/37987. In this system and method a VCO generates an IF-signal with a frequency dependent on an input control voltage. The transfer function from voltage to frequency depends on the type of component, variations between different components, variations in temperature etc. This leads to deviation errors. In order to demodulate the information carrying signal satisfactorily the deviation errors, which are not known, must be corrected. Therefore the receiver includes means for correction of the deviation error.

Said document does not contain any information about how to achieve an efficient use of the available bandwidth, in a general situation.

The present invention however, aims at the problem of improving the efficient use of the bandwidth.

Further, in the present invention the information carrying signal is modulated with a known and selected modulation index. Therefore, no correcting device or measurement device are needed. The present invention therefore simplifies the efficient use of the available bandwidth.

Further, it is a general problem to use an assigned bandwidth efficiently for transmitting information carrying signals.

SUMMARY OF THE INVENTION

It is an object of the invention to provide a method and a system for transfer of a digital information carrying signal, employing a decreased bandwidth and still making it possible to use a simple or desired decision device (phase detector or demodulator).

It is also an object of the invention to provide a method and a system for transfer of a digital information carrying signal, employing an assigned bandwidth and still making it possible to use a simple or desired decision device.

It is also an object of the invention to provide a method and a system for transfer of a digital information carrying signal, in which the bandwidth can be adjusted or selected as desired, and still making it possible to use a simple or desired decision device.

It is also an object of the invention to provide a method and a system for transfer of a digital information carrying signal, in which the modulation index can be selected as desired and, still making it possible to use a simple or desired decision device.

It is also an object of the invention to provide a method and a system for transfer of a digital information carrying signal, in which the bit rate can be increased while maintaining the allowed bandwidth, and still making it possible to use a simple decision device.

It is also an object of the invention to provide a simple and cost effective method and system for transfer of a digital information carrying signal.

These and other objects are attained by the features of the characterizing portions of the independent claims.

It is also an object of the invention to provide a method and a system for transfer of a digital information carrying signal, in which the bit rate can be increased, more correcting code can be added, and the modulation index can be decreased, while maintaining the allowed bandwidth, and still making it possible to use a simple decision device and attain an improved transfer capacity.

DESCRIPTION OF PREFERRED EMBODIMENT

Figure 1:
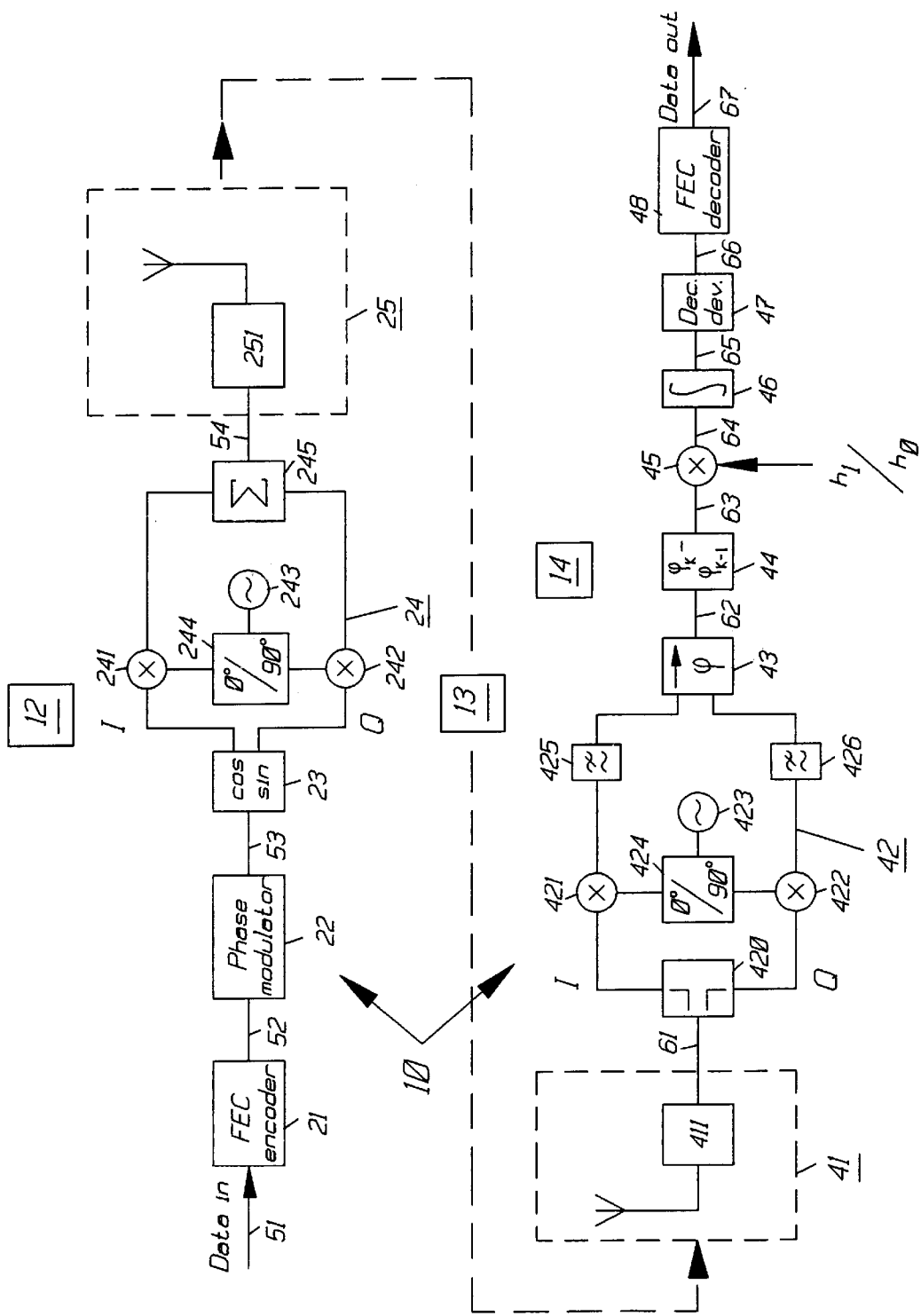
FIG. 1 shows a schematic block diagram of a system for transfer of a digital information carrying signal according to the invention.

Referring to FIG. 1, a system for transfer of a digital information carrying signal is shown, and generally denoted 10. The system 10 includes a transmitter 12 and a receiver 14. A transmission medium between the transmitter 12 and the receiver 14 is denoted 13. In this embodiment the transmitter 12 and the receiver 14 are designed for wireless transmission over a transmission medium which is air. Other transmission media could also be employed, and in such a case the transmitter 12 and the receiver 14 have to be designed for transmitting and receiving, respectively, via the medium used. Such media could for example be wires, wave guides, coaxial lines or optical fibres.

An information carrying signal 51 which is to be transferred by the system is input via the input of the transmitter 12. In this embodiment this input is the same as the input of a FEC (forward error correction) encoder 21. Through the operation in this encoder a desired amount of correcting code can be added to the signal. The space for correcting code is dependent on the bit rate and the bandwidth used in the system for the transfer. The use of correcting code is necessary in most cases in order to maintain an acceptable BER (bit error rate).

The FEC encoder 21 is connected with its output to the input of a phase modulator 22. The FEC encoded signal 52 which is output from the FEC encoder 21 has a higher bit rate than signal 51, since it contains more information, and is input to the modulator, which includes the phase modulator 22, an I-phase (in-phase) and Q-phase (quadrature-phase) generator 23, and a quadrature modulator 24.

In the phase modulator 22 the bit stream 52 on its input is converted to a phase signal 53. When MSK (minimum shift keying) modulation is used, only two different phase signal components are generated, one representing 0, and the other representing 1. Through selecting those phase signal components and using the same signal component to represent a 0 without any change in time, and using the same signal component to represent a 1 without any change in time, the modulation index h can be set to a fixed and desired value $h_0$. Even if MSK modulation is used in this embodiment of the invention, the invention can be carried out with all types of CPM (Continuous Phase Modulation), whereof MSK, TFM and 3RC are examples. The modulation index is selected with the intent to obtain an optimal use of the available bandwidth. This should be optimal for bandwidth and bit rate. The different signals generated in the phase modulator 22 will be discussed further below, in connection to FIGS. 2 and 3.

Further, the output of the phase modulator 22 is connected to the input of an I-phase and Q-phase generator 23. The I and Q components (i.e. $\cos\Phi$, $\sin\Phi$ respectively) are generated in this generator from the phase signal 53. In the digital domain this operation is generally performed by means of a table look-up. Although the phase modulator 22 and the I-phase and Q-phase generator 23 are shown as separate units, they could preferably be put together to form one unit.

The I-phase and Q-phase generator 23 is at its output connected to the input of a quadrature modulator through an I channel and a Q channel. Each of the information carrying signals in the I and Q channels, respectively is mixed (modulated) in a respective mixer 241, 242, which are multiplying the input signals with a modulation frequency which is 90° phase shifted between the channels. The mixing frequency is generated in a signal generator 243, and is phase-shifted for one of the channels in a phase-shifter 244, and supplied to the mixers 241, 242 of the I and Q channels, respectively. The modulated (mixed) information carrying signals of the I and Q channels are added in means 245, which outputs the information carrying signal 54. This signal only contain the real parts of the information carrying signals of the I and Q channels, since the imaginary parts cancel each other in the adding operation.

Signal 54 is fed to a transmission means 25 for transmission of the modulated information carrying signal through the transmission medium 13. The design of the transmission means 25 depends on the transmission medium. Possibly means 251 for up-converting, amplifying, and filtering the information carrying signal will be included in the transmission means 25. In the shown embodiment, the information carrying signal is transmitted to the transmission medium by means of an antenna.

After the transmission through the transmission medium the information carrying signal is received by a receiving means 41 included in the receiver 14. The receiver 14 further includes a demodulator and a FEC decoder 48. The demodulator includes a quadrature demodulator 42, a phase converter 43, a differentiator 44, an amplifier 45, an integrator 46 and a decision device 47. The receiving means 41 is shown to include an antenna and possibly means 411 for down-converting, amplifying, and filtering.

The receiving means 41 is connected at its output to the input of a quadrature demodulator 42. The information carrying signal enters the quadrature demodulator 42 at the input of a splitter 420, which divides the signal 61 into a I channel and a Q channel. The information carrying signals in the I and Q channels are each demodulated in the demodulators (mixers) 421, 422, respectively, which multiply the input signals with a mixing frequency, which is 90° phase-shifted between the channels. The mixing frequency is generated in a signal generator 423, and is phase-shifted for one of the channels in a phase-shifter 424, and supplied to the mixers 421, 422 of the I and Q channels, respectively. The demodulated (mixed) information carrying signals of the I and Q channels are filtered in low pass filters 425, 426, respectively, and thereafter fed to a phase converter 43 which gives an information carrying phase signal 62. The information carrying phase signal 62 is differentiated in a differentiator 44, so as to generate an information carrying frequency signal 63, i.e. a momentary frequency value 63. It is necessary to obtain the momentary frequency value 63 in order to be able to change the modulation index.

From the output of the differentiator 44, the momentary frequency value 63 is fed to a digital amplifier (or multiplier) 45 in which it is amplified (or multiplied) with the factor $A=h_1/h_0$, where $h_0$ is the selected and fixed modulation index which is set in the modulator, and $h_1$ is the desired modulation index for the decision device. Thus a scaled information carrying frequency signal 64 is created in the digital amplifier (or multiplier) 45.

The scaled information carrying frequency signal 64 is then fed to an integrator 46 where it is integrated in order to create a scaled information carrying phase signal 65. This signal is thereafter fed to a decision device (phase detector or phase demodulator) 47 for creating a bit stream 66, corresponding to the bit stream 52, from the scaled information carrying phase signal 64. The bit stream 66 is fed to a FEC-decoder, which decodes the bit stream, thus creating on its output an information carrying signal 67, corresponding the information carrying signal 51 input to the transmitter 12.

The decision device 47 is designed for a certain modulation index $h_1$. In order to secure an acceptable result of the demodulation, it is important that the information carrying signal 65 to be demodulated has an appropriate modulation index. An example of a common and simple decision device is the de Buda-detector, which is designed for a modulation index $h_1=0.5$. Other decision devices designed for other modulation indices are also available, but such decision devices are generally more complex.

Figure 2:
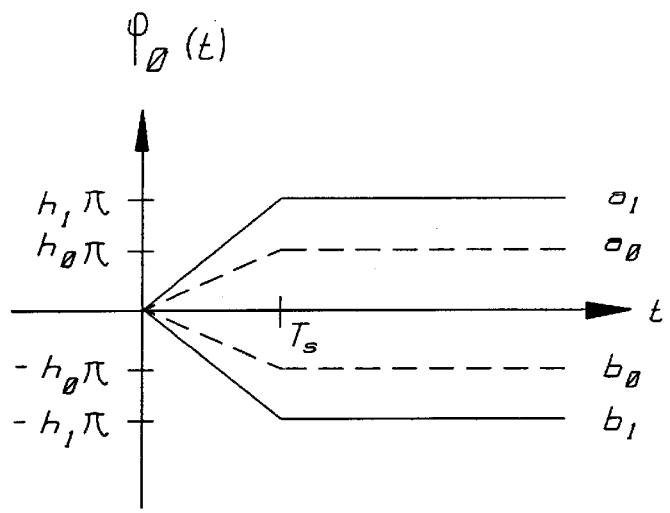
FIG. 2 shows a diagram of different phase signals generated in a phase modulator.

FIG. 2 is a diagram showing different phase signal components generated in a phase modulator representing 0 and 1, respectively. The signal component $a_1$ represents 1 generated in a phase modulator of the same kind as the phase modulator 22, but with a modulation index $h=h_1$. Signal component $b_1$ is a signal component representing 0 generated in the same phase modulator. It is common to use a modulation index $h=0.5$ since $\Phi_0(t)=\pi/2$, for signal component $a_1$, at $t=T_s$ (where $T_s$ is the symbol period), and only a simple decision device is required. However the phase modulator 22 according to the invention has a modulation index $h=h_0$ being higher or lower than $h_1$, provided that the decision device requires a modulation index $h=h_1$. The two different phase signal components generated in the phase modulator 22 representing 0 and 1, respectively, are shown with broken lines, for the case that $h_0$ is lower than $h_1$. The signal component $a_0$ represents 1 and signal component $b_0$ represents 0. As seen from the diagram $\Phi_0(t)<\pi/2$, for signal component $a_0$, at $t=T_s$.

Figure 3:
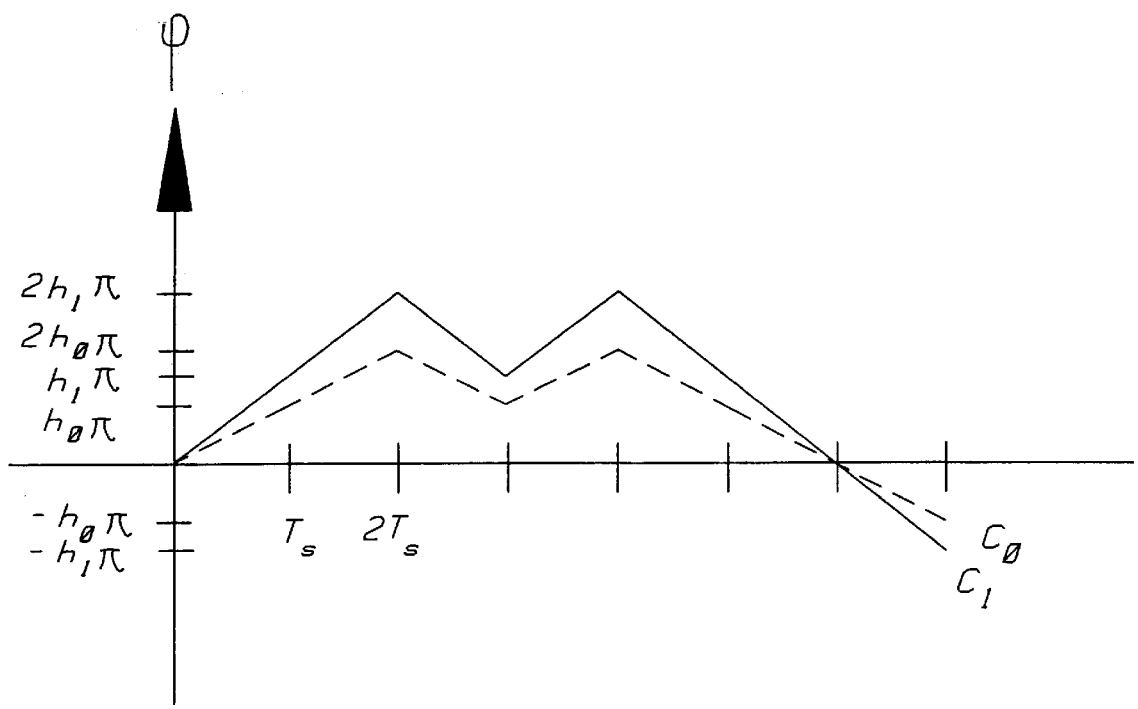
FIG. 3 shows a diagram representing the information carrying phase function created in a phase modulator.

FIG. 3 is a diagram representing the information carrying phase function created in a phase modulator, built up from the components shown in FIG. 2. This function can be described as:

$$\varphi(t) = \sum_{i=-\infty}^{i=\infty} a_i \varphi_0(t - iT_s), \; a_i = \{-1, 1\}$$

In the diagram the information carrying phase function representing the sequence 1101000, is shown for a phase modulator with a modulation index $h=h_1$ (function $c_1$), and for a phase modulator according to the invention, with a modulation index $h=h_0$ (function $c_0$). Also in this case the modulation index for the phase modulator 22 according to the invention has a modulation index $h_0$ which is lower than $h_1$, even if the opposite could be the case.

By using the system and method according to the invention it is achieved that the bandwidth of the transmitted information carrying signal through a transmission medium can be adjusted to the assigned or available bandwidth. It is also achieved that a decision device requiring any modulation index can be used, while still having freedom to select modulation index for the modulation, high degree of correcting code and a high bit rate, thereby providing a high transfer capacity. It is also achieved that the bit rate can be increased significantly, allowing a great amount of correcting code to be added, which makes it possible to decrease the modulation index, whereby the assigned or available bandwidth is maintained, resulting in an increased transfer capacity.

Although the invention has been described in conjunction with a preferred embodiment, it is to be understood that various modifications may still be made without departing from the spirit and scope of the invention, as defined by the appended claims. For example the types of modulations and demodulations as well as different components can vary.

What is claimed is:

1. A system for transfer of a digital information carrying signal between an input of a transmitter and an output of a receiver, the transmitter including a modulator for modulating the information carrying signal, the modulator being connected to transmission means for transmission of the modulated signal via a transmission medium, the receiver including receiving means, for receiving the transmitted signal, connected to a demodulator for demodulating the received signal, characterized in the modulator being arranged to modulate the information carrying signal with a predetermined first modulation index $h_0$, adapted for efficient use of an available bandwidth of said transmission medium, means connected to the receiving means for creating a frequency signal from the received signal, an amplifier means connected to the means for creating a frequency signal for amplifying the frequency signal with a factor A, and thereby creating a scaled frequency signal, a means for creating a scaled phase signal from the scaled frequency signal being connected, at its input, to the amplifier means, a decision device, connected at its input to the output of the means for creating a scaled phase signal, operating with a predetermined second modulation index $h_1$ being arranged to generate a digital output signal as a response to the scaled phase signal created in the demodulator, and said factor A being equal to $h_1/h_0$.

2. The system according to claim 1, wherein a FEC-encoder is connected at its input to the input of the transmitter and at its output to the modulator, and a FEC-decoder is connected at its input to the output of the decision device and at its output to the output of the receiver.

3. The system according to claim 1, wherein the modulator includes a quadrature modulator.

4. The system according to claim 1, wherein the demodulator includes a quadrature demodulator.

5. The system according to claim 1, wherein the modulator includes means for creating a signal representing a phase value from said information carrying signal, the means for creating a signal representing a phase value is arranged so as to give the signal representing a phase value the predetermined first modulation index $h_0$ being higher or lower than the predetermined second modulation index being $h_1=0.5$.

6. The system according to claim 1, wherein the means for creating a frequency signal from the received signal is a differentiator.

7. The system according to claim 1, wherein the means for creating a scaled phase signal is an integrator.

8. The system according to claim 1, wherein the modulation means is arranged to modulate the signal to be transmitted so that it is falls within in the microwave frequency range.

9. The system according to claim 1, wherein the predetermined first modulation index $h_0$ is lower than the predetermined second modulation index $h_1$.

10. The system according to claim 1, wherein the predetermined first modulation index $h_0$ is higher than the predetermined second modulation index $h_1$.

11. A method for transfer of a digital information carrying signal between an input of a transmitter and an output of a receiver, where the information carrying signal is modulated in a modulator included in the transmitter, the modulated signal is transmitted via a transmission medium by transmission means connected to the modulator, the transmitted signal is received by receiving means included in the receiver, and the received signal is demodulated in a demodulator, characterized in the information carrying signal being modulated with a predetermined first modulation index $h_0$, adapted for efficient use of an available bandwidth of said transmission medium, a frequency signal being created from the received signal, the frequency signal being amplified with a factor A, for creating a scaled frequency signal, a scaled phase signal being created from the scaled frequency signal, a digital output signal is created as a response to the scaled phase signal in a decision device operating with a predetermined second modulation index $h_1$, and said factor A being selected to be equal to $h_1/h_0$.

12. The method according to claim 11, wherein the information carrying signal is encoded in a FEC-encoder connected at its input to the input of the transmitter, and the information carrying signal is decoded in a FEC-decoder connected at its output to the output of the receiver.

13. The method according to claim 11, wherein the modulation includes quadrature modulation.

14. The method according to claim 11, wherein the demodulation includes quadrature demodulation.

15. The method according to claim 11, wherein the modulation includes creating a signal representing a phase value from said information carrying signal, the signal representing a phase value is created so as to have the predetermined first modulation index $h_0$ being higher or lower than the predetermined second modulation index being $h_1=0.5$.

16. The method according to claim 11, wherein the digital momentary frequency signal is achieved by differentiation.

17. The method according to claim 11, wherein the scaled phase signal is created by integration.

18. The method according to claim 11, wherein the information carrying signal is modulated so that the signal to be transmitted falls within the microwave frequency range.

19. The method according to claim 11, wherein the predetermined first modulation index $h_0$ is lower than the predetermined second modulation index $h_1$.

20. The method according to claim 11, wherein the predetermined first modulation index $h_0$ is higher than the predetermined second modulation index $h_1$.

* * * * *